(12) United States Patent
Boeck et al.

(10) Patent No.: US 9,828,888 B2
(45) Date of Patent: Nov. 28, 2017

(54) DIRECT TIMING SYSTEM FOR INTERNAL COMBUSTION ENGINE

(71) Applicant: Francois Boeck, Saint Josse ten Noode (BE)

(72) Inventors: Francois Boeck, Saint Josse ten Noode (BE); Alfonso Santiago Munoz, Almunecar (ES)

(73) Assignee: Francois Boeck, Saint Josse ten Noode (BE)

( * ) Notice: Subject to any disclaimer, the term of this patent is extended or adjusted under 35 U.S.C. 154(b) by 82 days.

(21) Appl. No.: 14/409,356

(22) PCT Filed: Jun. 17, 2013

(86) PCT No.: PCT/BE2013/000029
§ 371 (c)(1),
(2) Date: Dec. 18, 2014

(87) PCT Pub. No.: WO2013/188932
PCT Pub. Date: Dec. 27, 2013

(65) Prior Publication Data
US 2015/0198068 A1     Jul. 16, 2015

(30) Foreign Application Priority Data
Jun. 18, 2012   (BE) .................................... 2012/403

(51) Int. Cl.
*F01L 9/04*     (2006.01)
*F01L 1/02*     (2006.01)
(Continued)

(52) U.S. Cl.
CPC ................ *F01L 1/026* (2013.01); *F01L 1/14* (2013.01); *F01L 9/02* (2013.01); *F01L 9/021* (2013.01);
(Continued)

(58) Field of Classification Search
CPC ..... F01L 9/04; F01L 9/02; F01L 9/023; F01L 9/021; F01L 2009/0403; F01L 2009/0405;
(Continued)

(56) References Cited

U.S. PATENT DOCUMENTS 4,258,672 A * 3/1981 Hietikko ............. F01L 13/0042
                                                              123/90.12
4,799,462 A * 1/1989 Tittizer ................... F01L 9/021
                                                              123/90.12
(Continued)

FOREIGN PATENT DOCUMENTS

GB     WO 2006090174 A1 * 8/2006 ................ F01L 9/02

*Primary Examiner* — Jason Shanske
*Assistant Examiner* — Kelsey Stanek
(74) *Attorney, Agent, or Firm* — Posz Law Group, PLC

(57) ABSTRACT

The object of this invention is to simplify the timing system of all types of internal combustion engine. The system eliminates existing conventional timing trains. The hydraulic, mechanical or electrical/electronic direct timing systems that form the subject of the invention offer minimal resistance and minimal transmission. The piston strokes are given directly by the crankshaft by means of a system fixed thereto which via a mechanical or hydraulic or electrical or electronic system transmits the strokes to the cylinder valves. The system can be connected to all types of indirect transmission and has adjusting systems that allow it to be adapted to suit all types of internal combustion engine.

10 Claims, 11 Drawing Sheets

(51) Int. Cl.
*F01L 9/02* (2006.01)
*F01L 1/14* (2006.01)
*F01M 1/02* (2006.01)
*F16C 1/20* (2006.01)

(52) U.S. Cl.
CPC ............... *F01L 9/023* (2013.01); *F01L 9/04* (2013.01); *F01M 1/02* (2013.01); *F01L 2009/0401* (2013.01); *F01L 2750/00* (2013.01); *F01M 2001/0269* (2013.01); *F16C 1/20* (2013.01)

(58) Field of Classification Search
CPC ..... F01L 1/026; F01L 1/14; F01L 1/02; F01L 2009/0401; F01L 2750/00; F01M 2001/0269; F01M 1/02
USPC ................................ 123/90.11, 90.12, 90.31
See application file for complete search history.

(56) References Cited

U.S. PATENT DOCUMENTS

| | | | | |
|---|---|---|---|---|
| 5,125,372 A | * | 6/1992 | Gondek | ..................... F01L 1/08 123/90.12 |
| 5,558,050 A | * | 9/1996 | Paro | ........................ F01L 9/021 123/90.13 |
| 2009/0266319 A1 | * | 10/2009 | Ervin | ........................ F01L 1/24 123/90.11 |
| 2012/0204825 A1 | * | 8/2012 | Tolbert | ..................... F01L 9/021 123/90.16 |

* cited by examiner

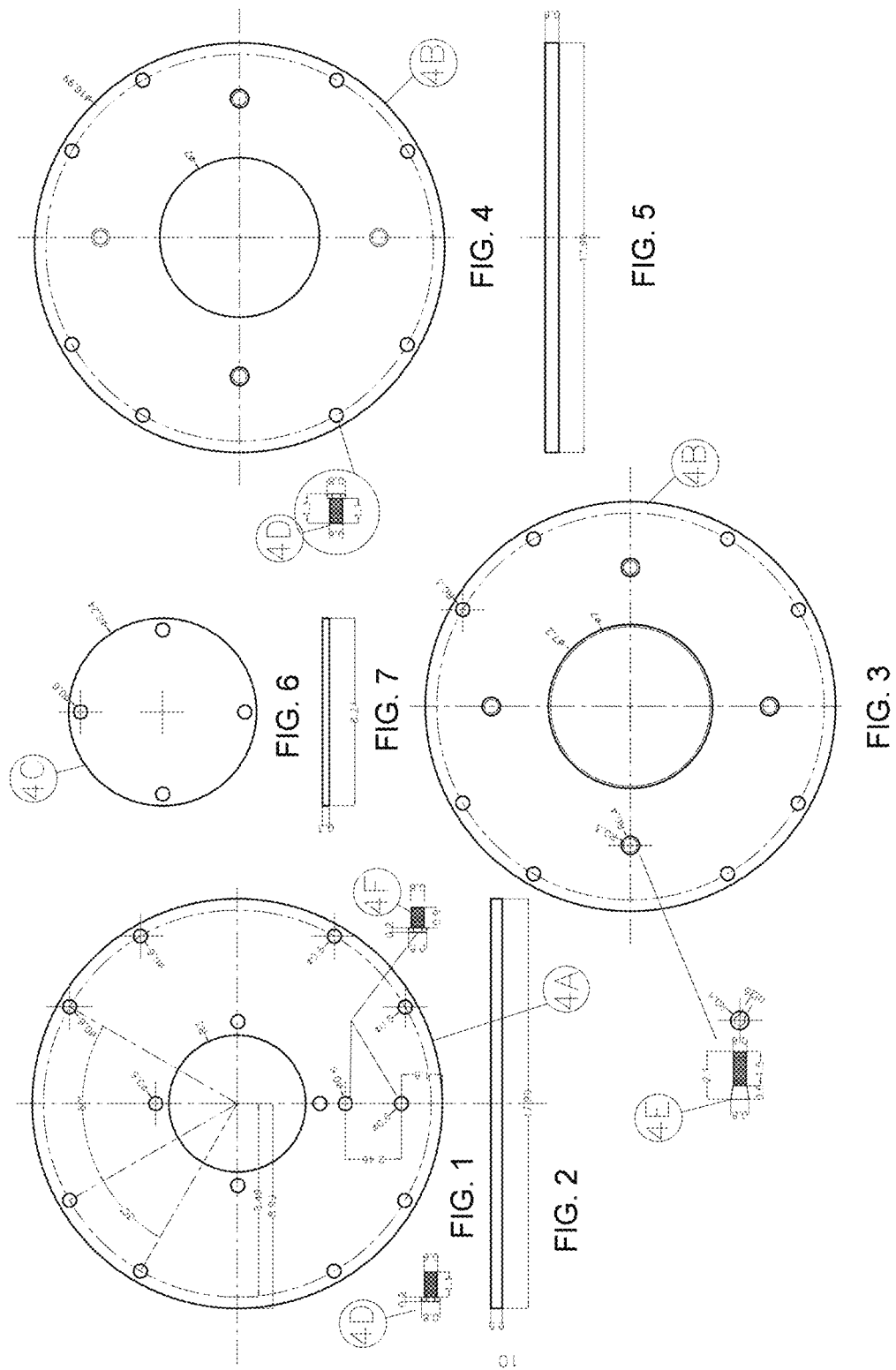

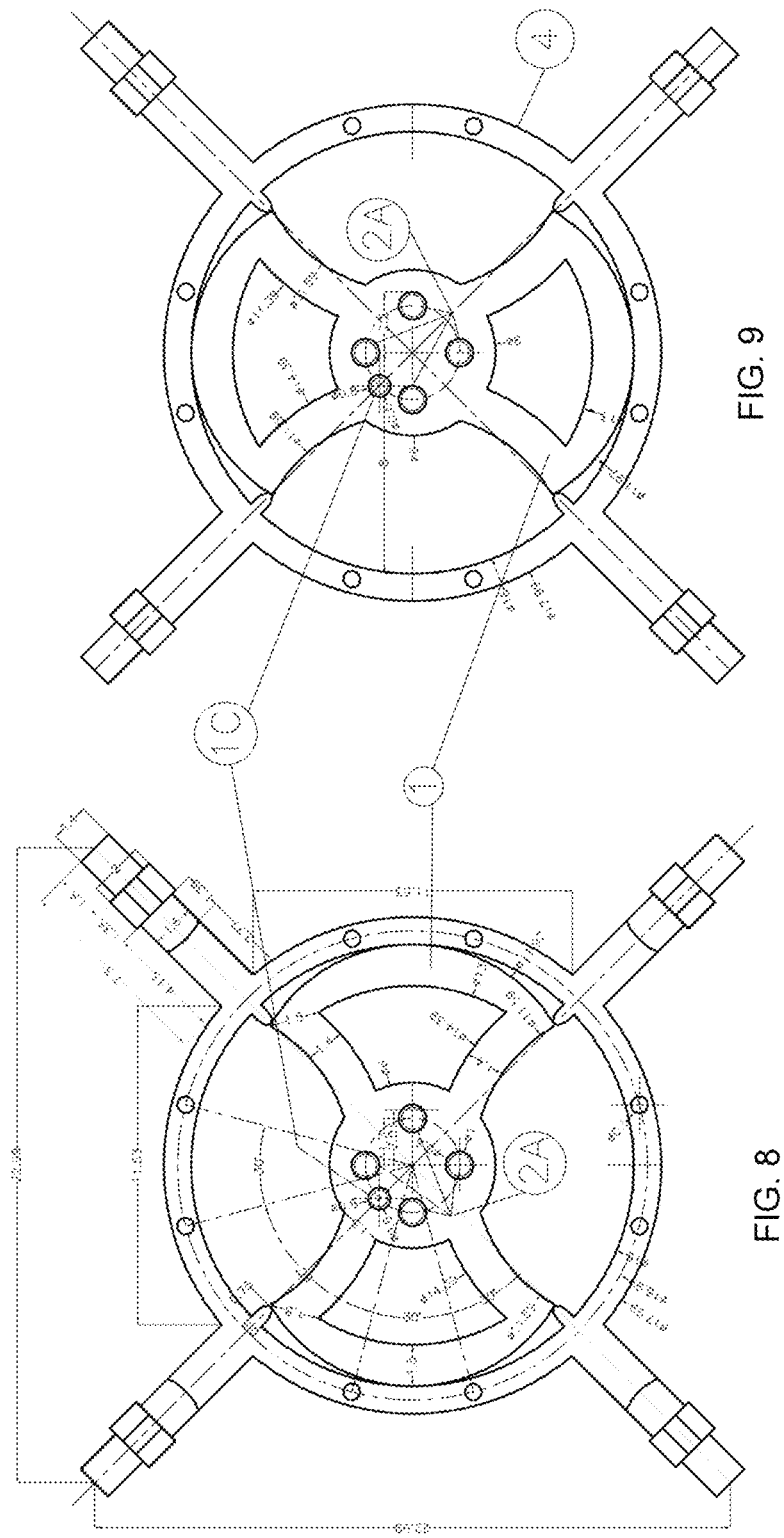

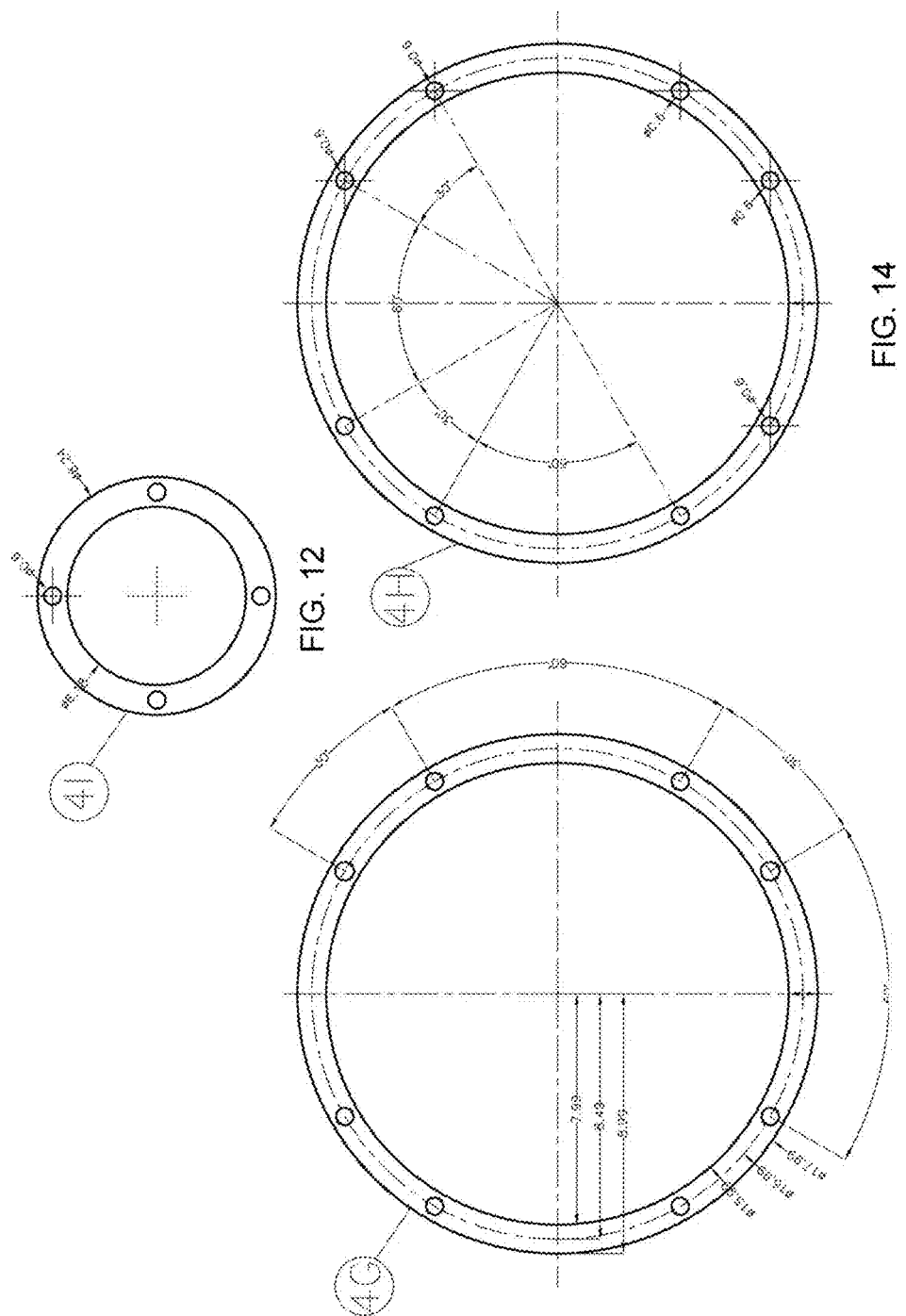

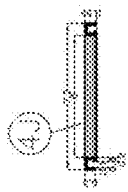
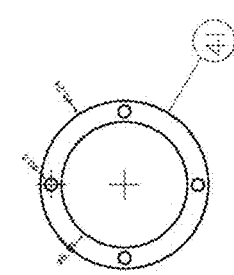
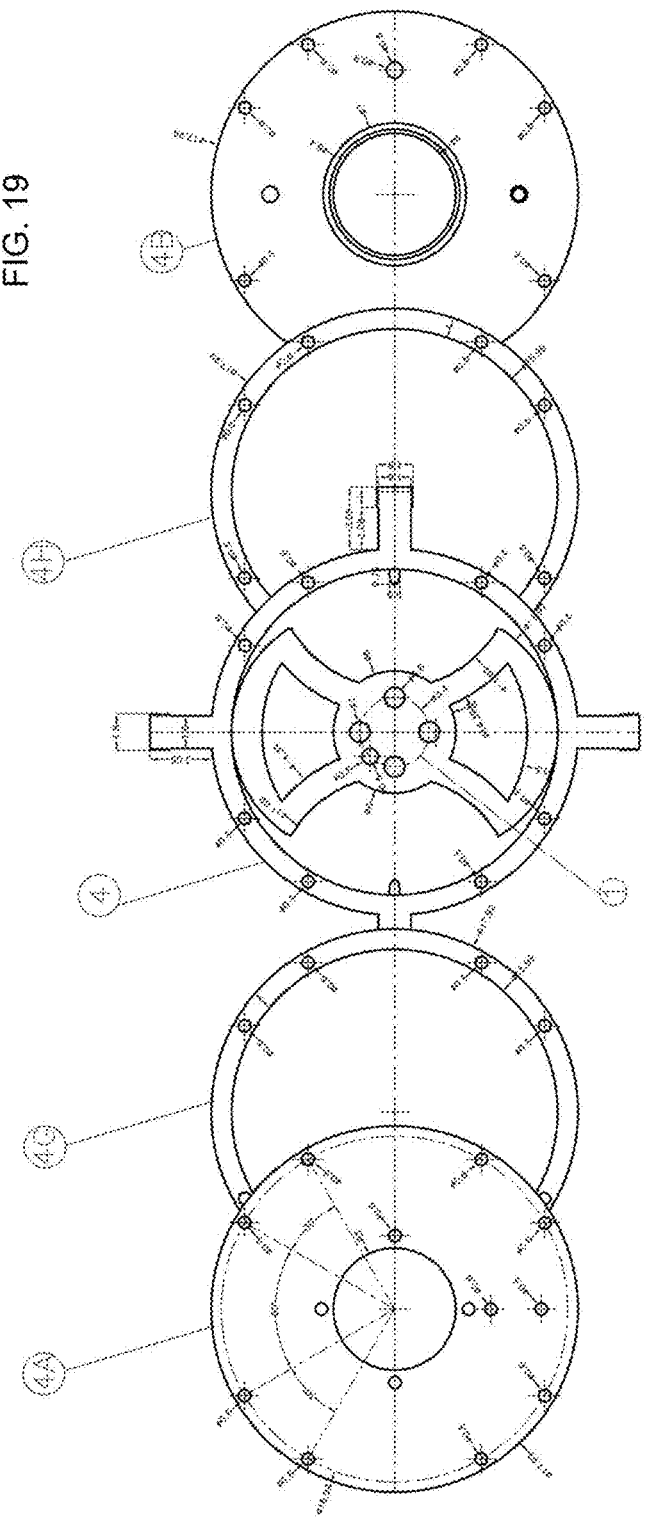

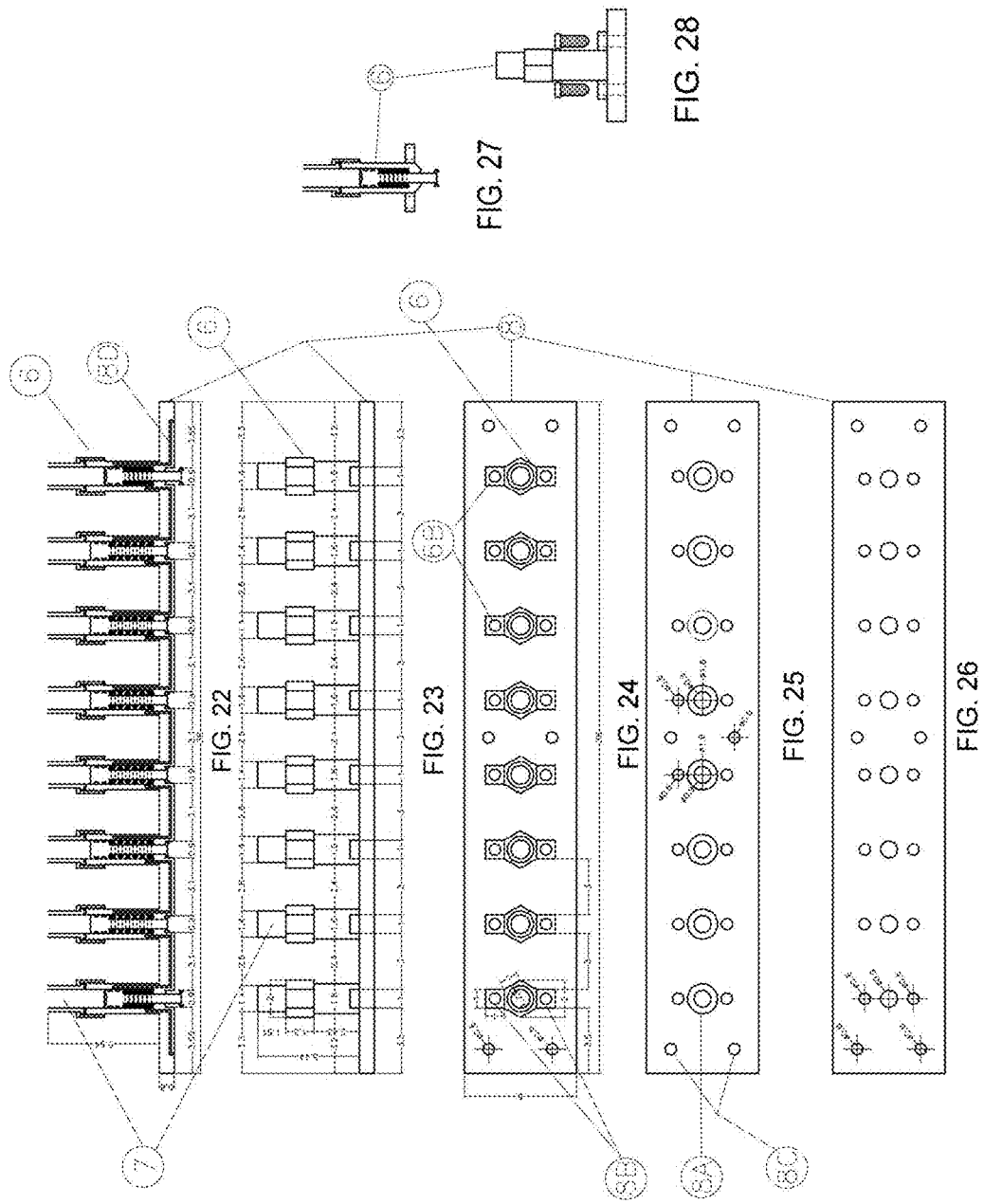

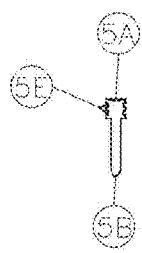    
FIG. 32    FIG. 33    FIG. 34    FIG. 35    FIG. 36
FIG. 37
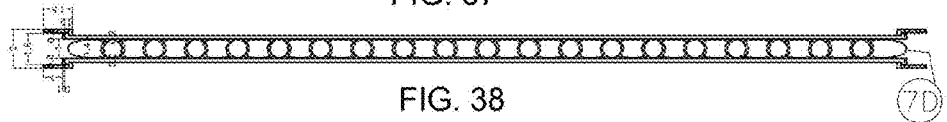
FIG. 38
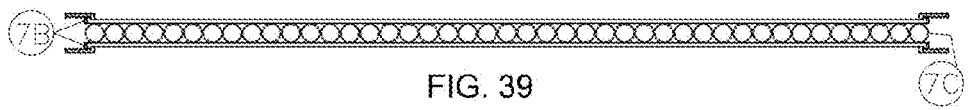
FIG. 39
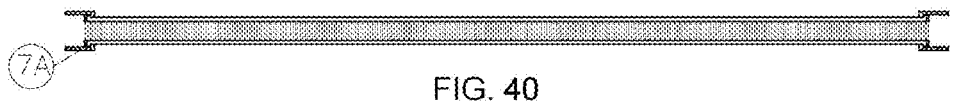
FIG. 40

DIRECT TIMING SYSTEM FOR INTERNAL COMBUSTION ENGINE

This application is the US national phase of PCT Application No. PCT/BE2013/000029 filed on Jun. 17, 2013, which claims priority to BE Patent Application No. 2012/403 filed on Jun. 18, 2012, the disclosures of which are incorporated in their entirety by reference herein.

The subject matter of this invention is an engine system that is more efficient in the use of fuels through simplifying the timing system of all types of internal combustion engines. The system does not necessitate camshafts or tappets nor transmission wheels, or transmission chain, nor gears, nor desmodromic timing, nor intermediate mechanical bearing or belt timing. This system enables lighter engines with higher efficiencies. The system eliminates the conventional timing transmission systems existing at present in internal combustion engines. The hydraulic direct timing system (or the other two types described hereinafter) that is the subject matter of the invention has a minimum resistance and a minimum transmission.

This system may be thought of as an information system exploiting the motion of the crankshaft to provide the engine timing. This is thanks to various types of devices, notably a rotor device attached to and fast with the crankshaft that, contained in a casing, by its movement actuates plungers or triggers electrical sensors, depending on the type, the latter transmitting their timing to the piston valves.

Compared to present engines, the systems make it possible to produce improved performance; that is, the system makes it possible to produce greater acceleration and lower fuel consumption with fewer cylinders. The quantity of fuel necessary to produce the same amount of work as the present system is much lower.

Problem and Technical Field: Timing in Internal Combustion Engines.

Present internal combustion engines necessitate relatively complex, costly and bulky timing systems, such as camshafts, tappets, transmission wheels, transmission chain, gears, desmodromic timing, intermediate mechanical bearing, belt timing.

Advantage of the Direct Timing System Relative to the Present State of the Art.

The engine starts with fewer turns of the starter motor. It starts more quickly than present engines. This enables a battery, electricity saving. This enables the use of a smaller and less powerful battery given the lower consumption of electricity on starting the engine. The pistons do not have to drive a camshaft as there is none in the system, which generates less friction and reduces the number of mechanisms: they are freer. The engine produces more power (horsepower) than existing systems. The engine has fewer transmission moving parts. With less transmission timing will be faster. The intake, compression, power, exhaust cycle is faster. This implies a saving in terms of fuel consumption. If the direct timing system suffers a fault in the hydraulic circuit, the valves will be closed automatically by the valve springs, eliminating the valves from the corresponding cycle. The system can operate with three cylinders. The location of the fault will be obvious given the loss of liquid in the pipes. Repair will not necessitate retuning the engine.

Cylinder Head Advantages.

The system enables the cylinder heads to be situated at a lower position compared to engines existing at present. As the cylinder head is lower the cooling liquid can enter at a higher pressure, which results in improved cooling. The low position of the cylinder head makes it more difficult to damage it. The system allows the use of smaller valves and springs. This enables a saving of materials in the construction of the cylinder heads, springs and valves.

BRIEF DESCRIPTION OF THE DRAWINGS

FIG. 1 is a diagrammatic plan view of a front cover and related screws.

FIG. 2 is a diagrammatic side view of the front cover.

FIG. 3 is a diagrammatic plan view of a rear cover and a related screw.

FIG. 4 is another diagrammatic plan view of the rear cover and related screw.

FIG. 5 is a diagrammatic side view of the rear cover.

FIG. 6 is a diagrammatic plan view of a register.

FIG. 7 is a diagrammatic side view of the register.

FIG. 8 is a diagrammatic view of an interior of a casing.

FIG. 9 is another diagrammatic view of the interior of the casing.

FIG. 12 is a diagrammatic plan view of a hermetic seal for a cover.

FIG. 13 is a diagrammatic plan view of another hermetic seal for a cover.

FIG. 14 is a diagrammatic plan view of a register seal.

FIG. 17 is a diagrammatic plan view of a register seal.

FIG. 18 is a diagrammatic plan view of an oil seal.

FIG. 19 is a diagrammatic side view of the rear cover.

FIG. 20 is an exploded view of the casing.

FIG. 22 is a diagrammatic side view of a lubrication system.

FIG. 23 is another diagrammatic side view of the lubrication system.

FIG. 24 is a diagrammatic plan view of the lubrication system.

FIG. 25 is a diagrammatic plan view of a strip.

FIG. 26 is another diagrammatic plan view of the strip.

FIG. 27 is a diagrammatic cross sectional view of a plunger.

FIG. 28 is a diagrammatic side view of the plunger.

FIG. 32 is a diagrammatic side view of a piston.

FIG. 33 is a diagrammatic side view of a spring.

FIG. 34 is a diagrammatic side view of a pair of washers.

FIG. 35 is a diagrammatic side view of a pair of piston rings.

FIG. 36 is a diagrammatic cross sectional view of the plunger.

FIG. 37 is a diagrammatic side view of a transmission pipe.

FIG. 38 is a diagrammatic cross sectional view of one embodiment of the transmission pipe.

FIG. 39 is a diagrammatic cross sectional view of another embodiment of the transmission pipe.

FIG. 40 is a diagrammatic cross sectional view of another embodiment of the transmission pipe.

DESCRIPTION

Figure 10:
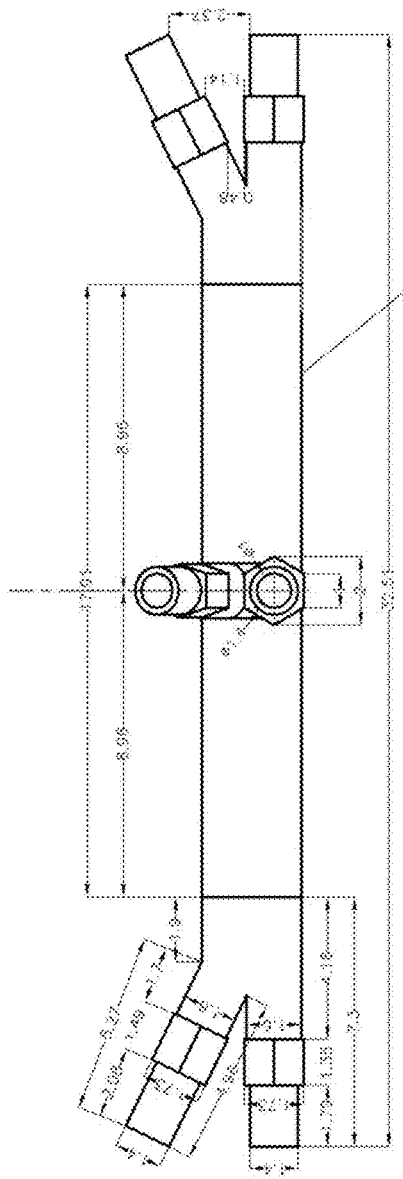
FIG. 10 is a diagrammatic side view of the casing.
Figure 11:
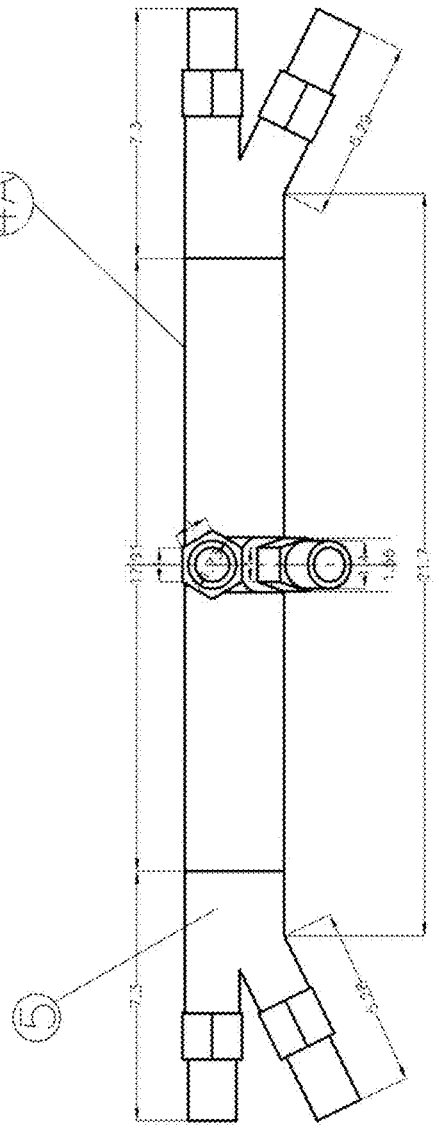
FIG. 11 is another diagrammatic side view of the casing.
Figure 16:
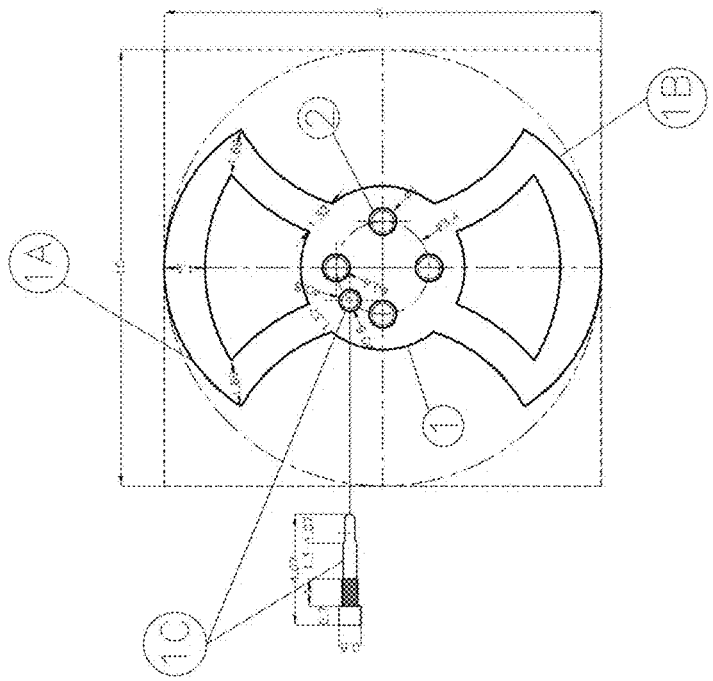
FIG. 16 is another diagrammatic view of the cam and an adjustment guide.
Figure 15:
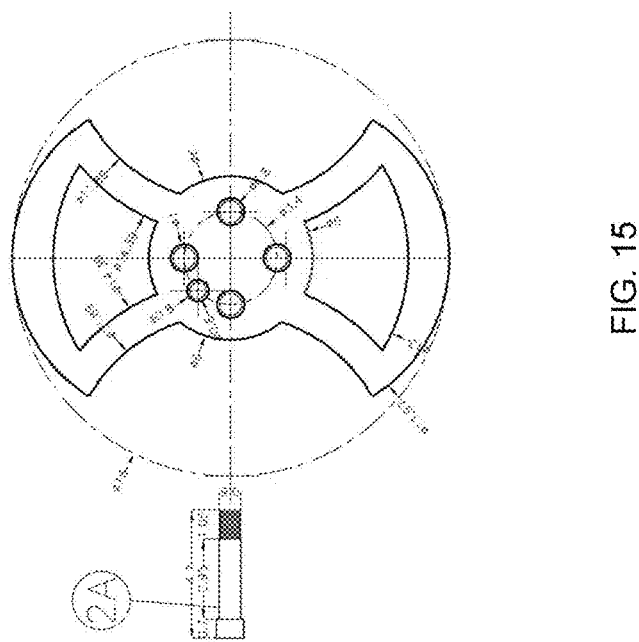
FIG. 15 is a diagrammatic view of a cam and a through bolt.
Figure 21:
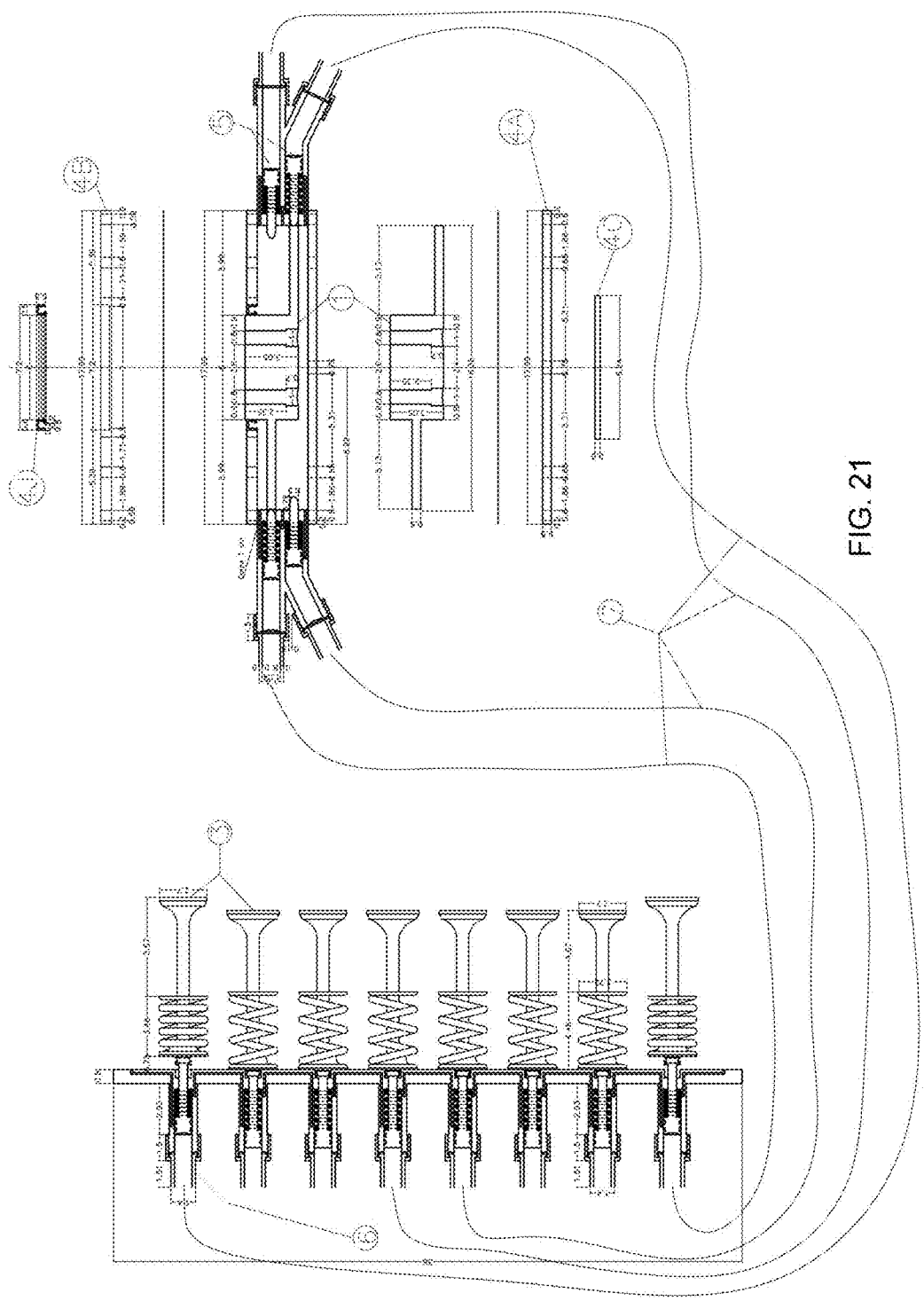
FIG. 21 is a diagrammatic view of the entire assembly, partially exploded.
Figure 29:
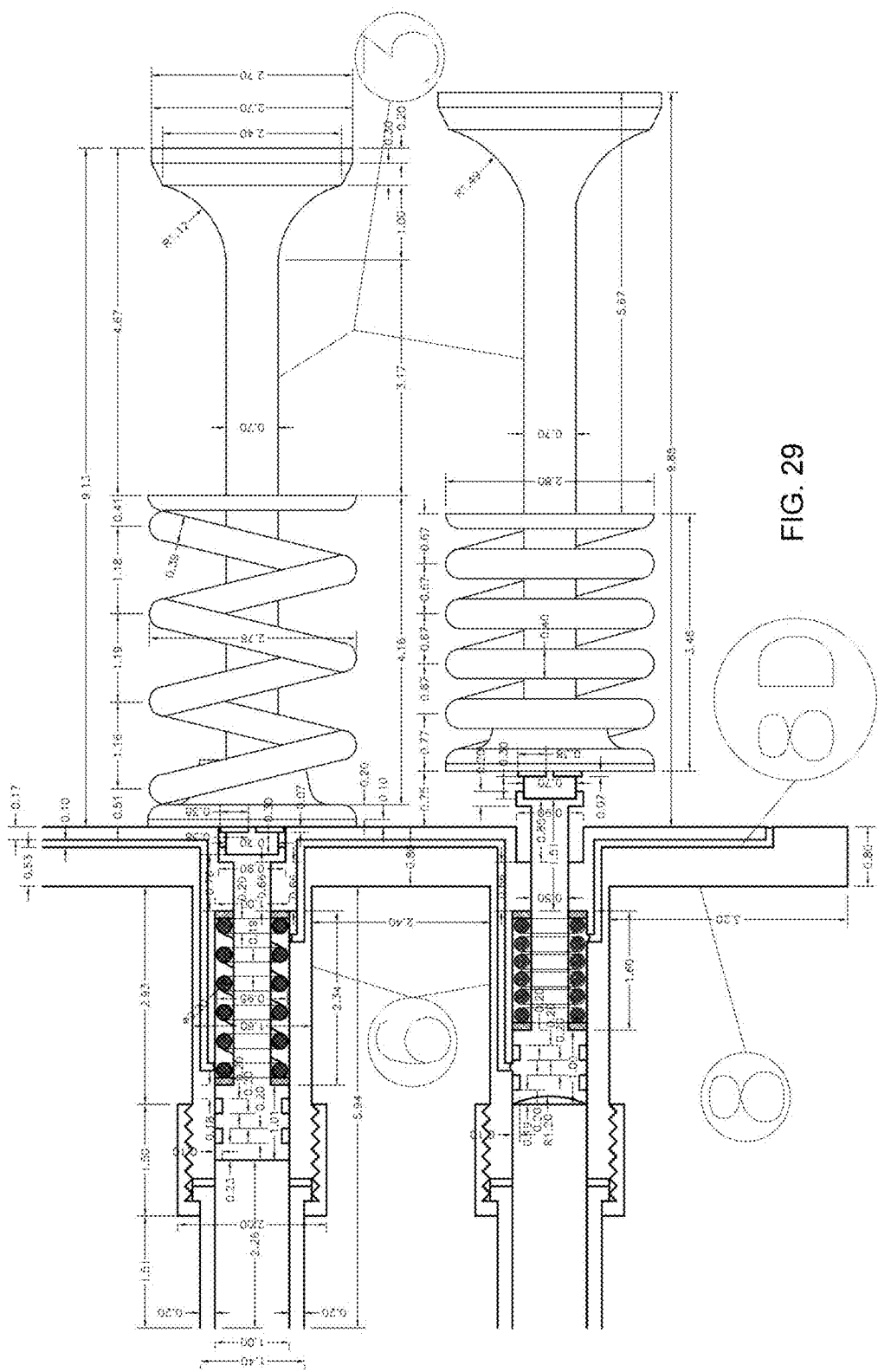
FIG. 29 is a diagrammatic cross-sectional view of a pair of valves and associated plungers.
Figure 31:
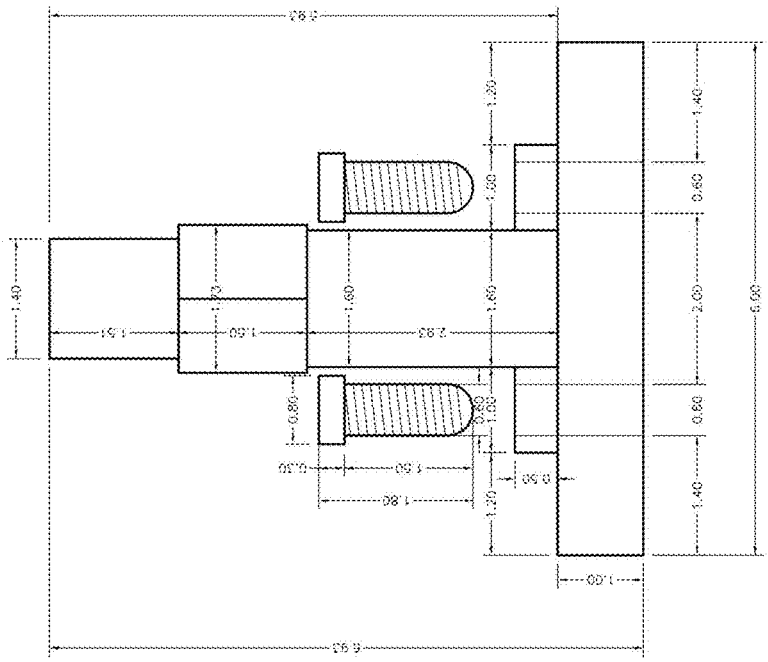
FIG. 31 is a diagrammatic side view of the plunger.
Figure 30:
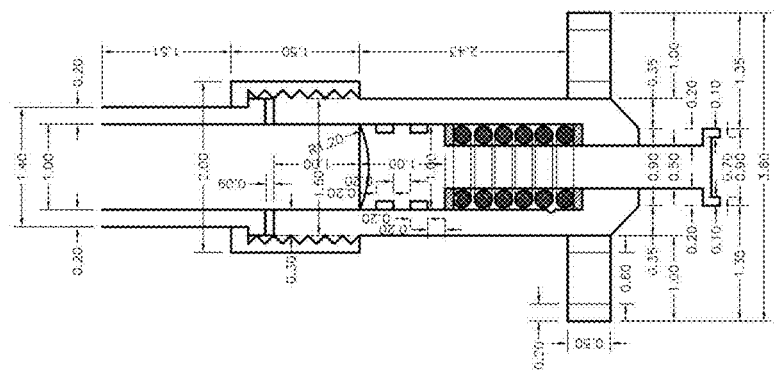
FIG. 30 is a diagrammatic cross-sectional view of the plunger.

FIG. 1:

The numbers and references between parentheses in the description and in the claims refer back to the encircled references in the figures.

Components of the System.

Direct Timing Components.

Rotor (1).

The rotor (1) actuates the mechanism that opens and closes the valves. The rotor consists of a mechanism fixed directly to the crankshaft (2) by four through-bolts (2A). The mechanism is made up of two superposed cams (1A, 1B), curved at their ends where the movement of the pistons is timed with reference to the opening of the cylinder head valves (3) relative to the engine timing (intake, compression, power, exhaust). The contact portion of the two cams (1A, 1B) consists of an antifriction material. The rotor has a screw type adjustment guide (1C). The rotor (1) also acts as a lubrication pump by virtue of its movement distributing oil onto the areas of contact between it and the rotor plungers (5).

Rotor Casing (4).

This consists of a casing (4) itself made up of two hermetically sealed covers: a front cover (4A) and a rear cover (4B) in which the rotor (1) is housed. A register (4C) is attached to the front cover (4A) by four 4F type screws (4F), sixteen screws (4D) joining the two hermetically sealed covers (4A and 4B) around the rotor (4). Four screws (4E) retain the rotor casing (4) on the engine block. Two screws (4F) are used for topping up and for filling and draining oil. Two hermetic seals (4G and 4H) respectively join the front cover (4A) and the rear cover (4B) to the rotor casing (4). A register seal (4I) joins the register (4C) to the casing (4) of the rotor. The oil seal (4J) is situated in the rear hermetically sealed cover (4B). Said casing (4) contains eight plungers (5). The plungers, pushed by the rotor connected to the crankshaft, transmit movement to the cylinder head valves (3) via transmission pipes (7). The rotor casing (4) is filled with a quantity of oil approximating 15% to 25% of its volume. The register (4C) is used to attach an accessory; namely the oil pump and indirect transmission systems (water pump, alternator, air-conditioner, power steering, servomotor).

Rotor Plungers (5).

A plunger comprises a piston (5A), a plunger (5B), a spring (5C), two washers (5D) and two cavities (5E) in which are housed two piston rings (5F). The contact portion of the piston of the plunger (5B) is made of an antifriction material.

Valve Plungers (6).

These are the same as the rotor plungers, the only difference being the shape of the head of the plunger (6A). The contact portion of the plunger (6A) is made of an antifriction material.

Transmission Pipe (7).

A transmission pipe consists of a flexible tube (7A) and an adjuster washer (7B). There are eight pipes of the same type, each connecting a valve of a valve plunger (6) to a rotor plunger (5). The transmission pipes are filled with oil.

The pipes may use three different plunger systems:

1. Hydraulic plunger: the pipes are filled only with oil.

2. Ball plunger: the pipes are filled with oil and force-transmitting objects, which are balls (7C), having a diameter corresponding to the inside diameter of the pipe.

3. Bullet plunger: the pipes are filled with oil and force-transmitting objects, which are bullet-shaped members (7D) and balls (7C), having a diameter corresponding to the inside diameter of the pipe.

Strip (8).

The strip is made up of eight cavities (8A) in which are housed the valve plungers (6), each of which is attached by two screws (6B) to the strip (8) The strip (8) includes sixteen holes (8B) for attaching the valve plungers to the strip (8). The strip (8) is fixed by six screws (8C) that fasten it to the cylinder head. The strip is perforated internally by a lubrication system (8D) that has the function of lubricating the valve plungers (6).

Tuning of Hydraulic Direct Timing System.

Present engines are generally tuned in the following order that is retained in the hydraulic direct timing system:

In piston order (not shown in the drawings): 1, 3, 4, 2.

We use the same ignition order by opening the valves in the same order.

The Hydraulic Direct Timing Cycle.

The cycle of opening the valves is defined by the rotor. The cycle is the same as the cycle of a conventional four-stroke engine. In the first quarter-turn of the crankshaft (0 to 90°) two valves will open in the cylinder head: the intake valve of the piston 1 and the exhaust valve of the piston 3. In the second quarter-turn of the crankshaft (90 to 180°) two valves will open in the cylinder head: the intake valve of the piston 3 and the exhaust valve of the piston 4. In the third quarter-turn of the crankshaft (180 to 270°) two valves will open in the cylinder head: the intake valve of the piston 4 and the exhaust valve of the piston 2. In the fourth quarter-turn of the crankshaft (270 to 360°) two valves will open in the cylinder head: the intake valve of the piston 2 and the exhaust valve of the piston 1. This completes the cycle.

Adaptations.

The direct timing system is designed to be coupled to conventional indirect transmission systems such as alternator, water pump, air-conditioner, power steering, servomotor and the oil pump. The oil pump coupled to the direct timing system is situated off the crankshaft. This makes it possible to reduce the size of the crankcase, the oil pump being situated off the latter.

Electrical Direct Timing System.

An electric rotor system differs in the following respects.

Eight electrical sensors corresponding to the eight cylinder head valves are placed in the rotor casing.

In the electrical system the eight cylinder head valves are electromagnetic valves.

The eight electrical sensors replace the rotor plungers.

In this electrical system the rotor includes on its contact surface devices that can be detected by the sensors when they are at a predetermined distance from the latter.

The sensors are connected to a central unit (which can be a computer, an electronic system, etc.) that by centralizing the information sent by the sensors determines the position of the rotor and consequently commands opening of the electromagnetic cylinder head valves in real time, the electromagnetic cylinder head valves also being connected to the central unit.

The invention claimed is:

1. A direct timing system that is applicable to any internal combustion engine in which the engine is timed with direct reference to movement of a crankshaft of the engine, wherein the timing system includes a mechanical system directly attached to the crankshaft to move integrally with the crankshaft, and wherein the mechanical system includes:
- a rotor, which rotates integrally with the crankshaft, wherein the rotor includes a pair of cams;
- a rotor casing that contains the rotor;
- information and force-transmission tubes, wherein the information and force-transmission tubes contain at least oil and a plurality of force-transmission members, wherein the force-transmitting members comprise balls or bullet-shaped members;
- rotor plungers; and
- valve plungers,
- wherein the cams push the rotor plungers, the rotor plungers transmit force to the force-transmitting members, and the force-transmitting members transmit force to the valve plungers, and wherein the valve plungers open corresponding engine valves with a timing that corresponds to motion of the crankshaft.

2. The direct timing system as claimed in claim 1, wherein, when the direct timing system is attached to the engine, each quarter-turn of the crankshaft will open an intake valve and an exhaust valve with the rotor, the transmission tubes, the rotor plungers, and the valve plungers, thus coordinating the timing of the cylinders by the motion of the crankshaft to which the rotor is directly attached.

3. The direct timing system as claimed in claim 1 wherein the rotor is made up of a pair of opposed cams, and wherein respective centers of the cams are angularly separated by 180 degrees about a rotation axis of the rotor.

4. The direct timing system as claimed in claim 1 wherein the rotor casing is filled partly with oil, and the rotor acts as a lubrication pump by virtue of its movement and distributes oil within the rotor casing.

5. The direct timing system as claimed in claim 1 wherein the direct timing system is adapted to be fastened to the crankshaft, and the rotor includes a plurality of openings for accommodating bolts that fasten the rotor directly to a crankshaft of the engine.

6. The direct timing system as claimed in claim 1 wherein the rotor plungers each include a piston and a spring, and each rotor plunger transmits force from the rotor through a corresponding one of the transmission tubes to a corresponding one of the valve plungers.

7. The direct timing system as claimed in claim 1 wherein the rotor casing includes a register, which is used to couple an accessory to the direct timing system.

8. The direct timing system as claimed in claim 1 wherein the direct timing system includes a strip for housing the valve plungers, each valve plunger is attached to the strip, and wherein the strip includes an internal lubrication system that lubricates the valve plungers.

9. The direct timing system as claimed in claim 1 wherein the rotor plungers are attached to the rotor casing and extend into an interior of the rotor casing.

10. The direct timing system as claimed in claim 1 wherein the rotor is adapted to be fastened to an end of the crankshaft.

* * * * *